United States Patent [19]

Bonko et al.

[11] Patent Number: 5,421,388
[45] Date of Patent: Jun. 6, 1995

[54] PNEUMATIC TIRE FOR USE ON AGRICULTURAL TRACTORS AND OTHER LIKE VEHICLES

[75] Inventors: Mark L. Bonko, Uniontown; Loran C. Lopp, Jr., Wadsworth, both of Ohio

[73] Assignee: The Goodyear Tire & Rubber Company, Akron, Ohio

[21] Appl. No.: 257,983

[22] Filed: Jun. 10, 1994

[51] Int. Cl.[6] .............................................. B60C 11/11
[52] U.S. Cl. ............................... 152/209 B; D12/147
[58] Field of Search ......... 152/209 B, 209 R, 209 WT; D12/146, 147, 149, 151

[56] References Cited

U.S. PATENT DOCUMENTS

| | | | |
|---|---|---|---|
| D. 158,031 | 4/1950 | Wilcox | D12/136 |
| D. 230,533 | 2/1974 | Wolford | D12/151 |
| D. 275,383 | 9/1984 | Stroble | D12/136 |
| D. 277,373 | 1/1985 | Tsujimoto | D12/140 |
| D. 298,020 | 10/1988 | Noji et al. | D12/149 |
| D. 301,443 | 6/1989 | Fujiki | D12/147 |
| D. 303,365 | 9/1989 | Bonko | D12/151 |
| D. 304,704 | 11/1989 | Fujiki | D12/146 |
| D. 304,707 | 11/1989 | Monta | D12/149 |
| D. 309,282 | 7/1990 | Hasegawa | D12/146 |
| D. 310,647 | 9/1990 | Monta | D12/146 |
| D. 316,691 | 5/1991 | Fujiki | D12/146 |
| D. 323,310 | 1/1992 | Nakatani | D12/146 |
| D. 326,071 | 5/1992 | Enoki et al. | D12/146 |
| D. 328,579 | 8/1992 | Manestar | D12/147 |
| 4,534,392 | 8/1985 | Bonko et al. | 152/209 B |
| 5,046,541 | 9/1991 | Bonko | 152/209 B |

Primary Examiner—Michael W. Ball
Assistant Examiner—Francis J. Lorin
Attorney, Agent, or Firm—David L. King

[57] ABSTRACT

A pneumatic agricultural tire 20 having a unique tread 32 is disclosed. The tread 32 has a plurality of lugs 50. The lugs 50 are arranged in two sets 60,62 of at least three axially adjacent substantially parallel lugs 50A,50B,50C, the sets 60,62 being repeated circumferentially around the tread 32. The first sets 60 are located on a first side of the tire 20 and the second sets 62 are located on the second side of the tire 20. The lugs 50A,50B,50C of the first set 60 are substantially perpendicular to lugs 50A,50B,50C of the second set 62.

15 Claims, 7 Drawing Sheets

PNEUMATIC TIRE FOR USE ON AGRICULTURAL TRACTORS AND OTHER LIKE VEHICLES

BACKGROUND OF THE INVENTION

This invention relates to pneumatic agricultural tires for use on farm tractors and similar agricultural type vehicles. Tractor tires must have good vibration characteristics on and off the road while maintaining good traction or drawbar characteristics. Such tires must also provide for the removal of soil, mud, etc., during infield use.

These design factors are particularly problematic on tires with wide section widths of 600 mm or greater. These tires are commonly employed in multiples of two or more per drive wheel position and in applications where the tractor has four wheel drive these tires are employed on both front steer and rear axle positions.

Figure 1:
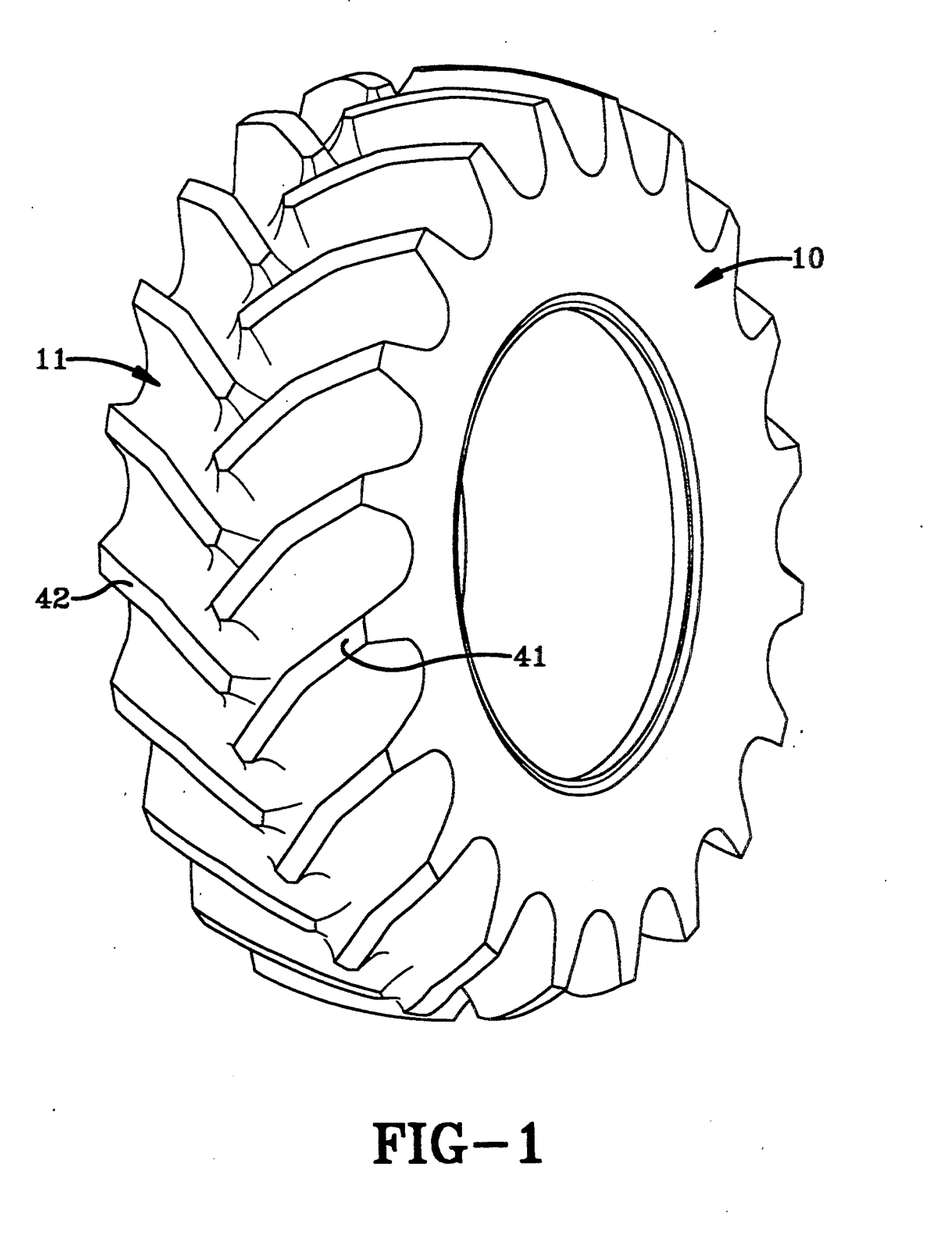
FIG. 1 is a perspective view of a tire according to the prior art.
Figure 2:
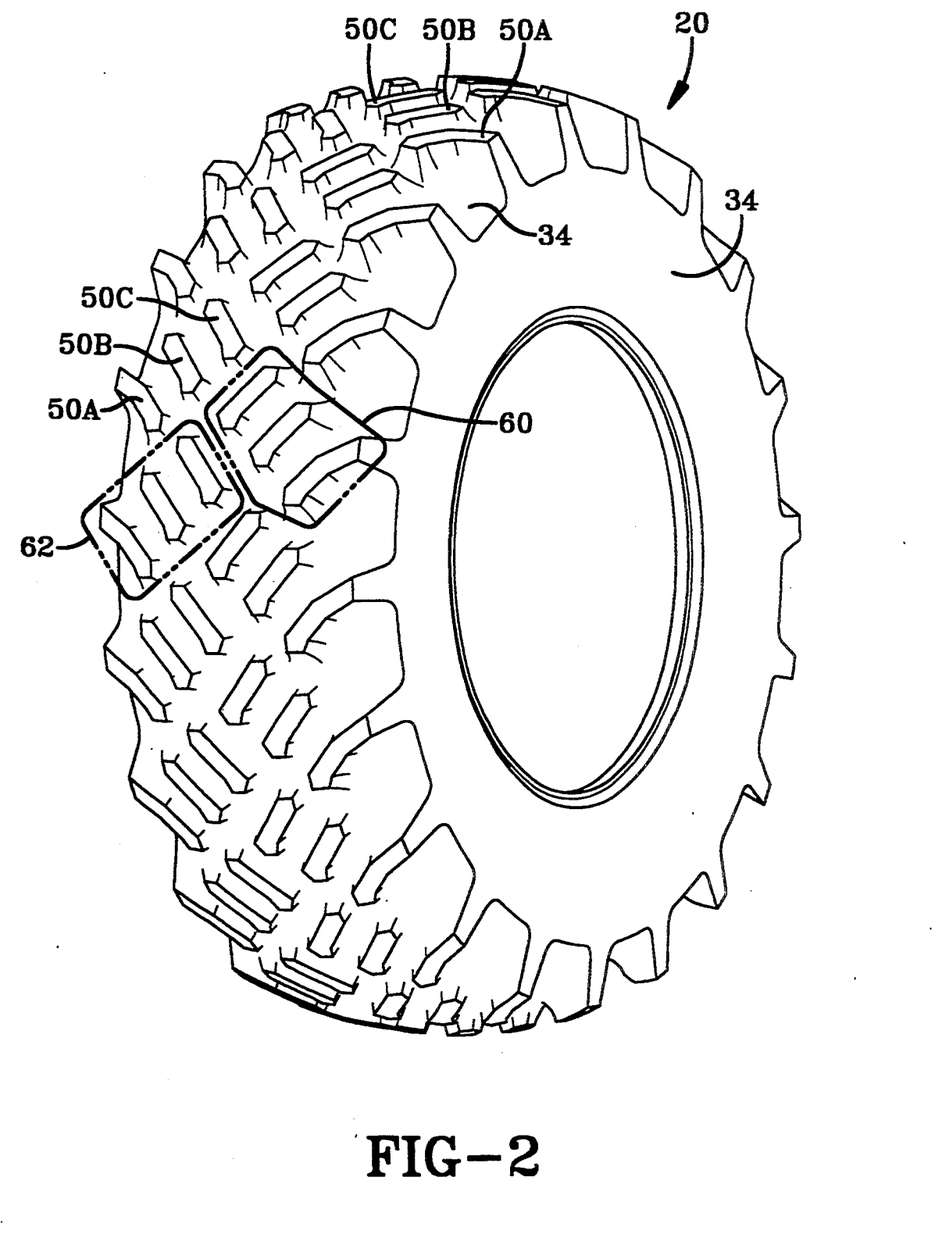
FIG. 2 is a perspective view of a preferred tire according to the present invention.
Figure 3:
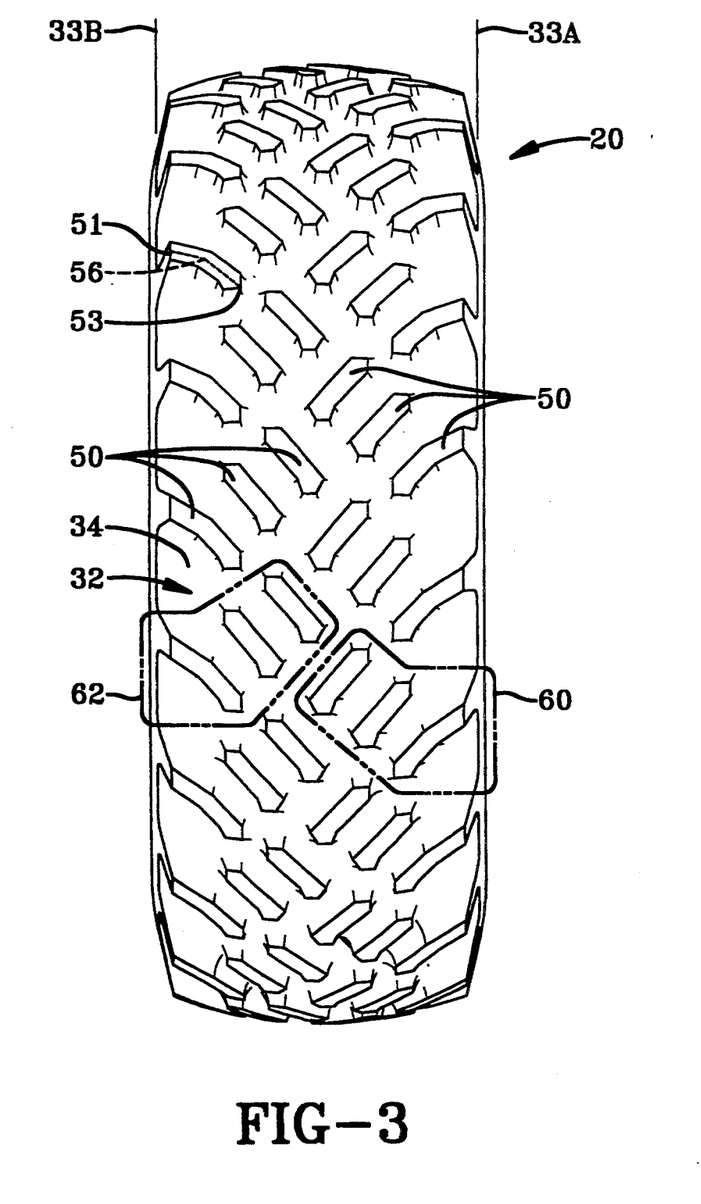
FIG. 3 is a plan view of the preferred tire according to the present invention.
Figure 4:
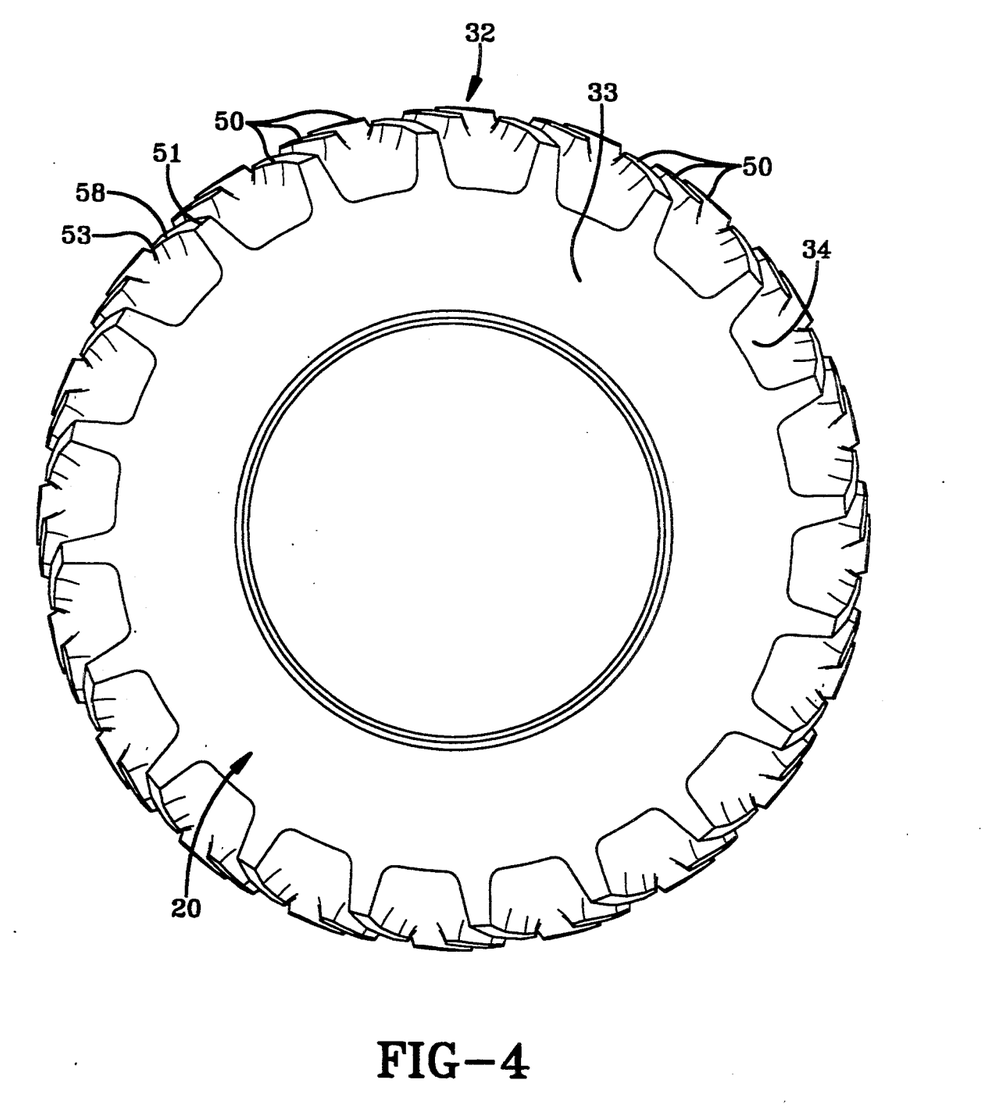
FIG. 4 is a side view of the preferred tire according to the present invention.

A commonly employed tire is the Goodyear DT 820 Super Traction Radial. This tire has excellent drawbar characteristics particularly in difficult heavy moist soil. The tire 10 as depicted in FIG. 1 has two sets of long 41,42 lugs oriented at about 45°. The long lugs 41,42 extend from each tread 11 edge to the center of the tread and have a depth 25% deeper than conventional R-1 tractor tires. This tire 10 was used as a control tire for comparative purposes.

As can be observed from the figure this prior art tire's long lugs 41,42 and wide spacing of the lugs although excellent for traction can be somewhat difficult in turning maneuvers. The large lugs 41,42 tend to act like a gear meshing in the soil and as the vehicle attempts to turn the tires 10 must decouple from the soil. This gear like effect is particularly troublesome in the steer axle position.

A second problem created by this deep long bar lug is soil compaction. Soil compaction is considered a serious problem which can result in increased topsoil erosion. The tractor tire lugs compress the soil. The compressed soil is less capable of absorbing rainfall which contributes to runoff of water, which in turn leads to soil erosion. The loss of topsoil means that the productive agricultural farmland becomes less productive requiring an increase in fertilizer and chemical usage to compensate for the depleted soil.

In 1992, The Goodyear Tire & Rubber Company introduced a new tractor tire having two sets of primary and secondary lugs. The tire is commercially sold as the DT 710 and is described in U.S. Pat. No. 5,046,541. As described in the patent, this tire has good traction, vibration and cleaning characteristics. These primary and secondary lugs are shorter in length than most tractor tire lugs. The tire effectively increases the number of lugs, and, therefore, has an increase in lug surface area. This increases the performance capabilities of the tire. The flexible nature of these relative short primary and secondary lugs may also help reduce the soil compaction potential of the tire even though more lug surface area is employed.

As the DT 710 product line was being developed and released into production the inventors observed there was a problem implementing this design into the large wide base tire sizes have 600/65 cross sections and larger.

Several attempts were made to scale the DT 710 tread layout on these larger sizes but the between-lug void in the shoulder area of the tread was too large and considered unacceptable. There was concern that the overall durability of the design would be compromised due to a reduction in lug and center element surface area as compared to conventional single lug patterns in the wide base tire sizes. In addition, the large shoulder void would most likely deter rather than enhance the ride and handling performance requirements. This was a very important point to consider because lug-induced vibration requirements must continue to improve in order to meet customer expectations.

When it became apparent to the inventors that the scaling limitations as described could not be corrected using the DT 710 tread pattern, a decision was made to develop a new version of the lug/center element concept. Many candidates were considered and one tread pattern in particular seemed quite promising.

That tread configuration is the subject of the present invention. A tread pattern made according to the present invention can exceed the excellent traction and vibration performance of the prior art tires while reducing soil compaction.

SUMMARY OF THE INVENTION

A pneumatic agricultural tire 20 is described. The tire has a maximum section width, an axis of rotation, an equatorial plane perpendicular to the axis, the equatorial plane being located at the midpoint of the maximum section width. The tire 20 has a nominal rim diameter of 24.0 inches or greater. The tire has a casing having a carcass 21 reinforced with rubber coated cord and a rubber tread 32 disposed radially outwardly of the carcass 21. The tread 32 has a first and a second tread edge and a plurality of tread lugs disposed between the tread edges. The lugs have a length of at least 10% of the section width. The tread, when normally loaded and inflated, has a net-to-gross ratio of the less than 40%, preferably about 25% or less.

The tread is characterized by a first and second set of lugs. The first set 60 has at least three axially adjacent, substantially parallel lugs 50A,50B,50C. The first set 60 is repeated a plurality of times circumferentially about the tread 32. The first sets 60 are located on a first side of the tread primarily between the first tread edge 33A and the equatorial plane (EP).

The second set 63 has at least three axially adjacent substantially parallel lugs 50A,50B,50C. The second set 62 is repeated a plurality of times circumferentially about the tread 32. The second sets 62 are located on a second side of the tread primarily between the second tread edge 33B and the equatorial plane (EP). In the footprint of the normally loaded and normally inflated tire, each set of at least three lugs are substantially perpendicular to the at least three lugs of a set located on the opposite side of the tread 32.

The pneumatic agricultural tire preferably has a section width 600 mm or greater.

In a preferred embodiment, the sets each have three lugs 50A,50B,50C, the axial inner two lugs 50B,50 of the sets 60,62 have radially outermost surfaces 58 having an outermost spacing (d) approximately equal to the length ($l_i$) of an axially innermost lug 50C and the axially outermost lug 50A is located adjacent a tread edge 33A or 33B and has a length ($l_i$) greater than the axially inner two lugs 50B,50C within a set 60 or 62.

The lugs 50 have a length less than 40% of the section width, preferably less than 30% more preferably less than 20%. The first and second set 60,62 of at least three lugs 50 preferably are repeated circumferentially about the tread at least fifteen times. In the preferred embodiment, each set is repeated twenty times.

Definitions

The following definitions are applicable to this specification, including the claims, wherein:

"Aspect ratio" of the tire means the ratio of its section height (SH) to its section width (SW) multiplied by 100% for expression as a percentage.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt reinforcing structure" means at least two layers of plies of parallel cords, woven or unwoven, underlying the tread, unanchored to the bead, and having both left and right cord angles in the range from 17° to 27° with respect to the equatorial plane of the tire.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Design rim" means a rim having a specified configuration and width.

"Design rim width" is the specific commercially available rim width assigned to each tire size and typically is between 75% and 90% of the specific tire's section width.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire and "outer" means toward its exterior.

"Lateral edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the preferred direction.

"Net-to-gross ratio" means the ratio of the normally loaded and normally inflated tire tread rubber that makes contact with a hard flat surface, divided by the area of the tread, including noncontacting portions such as grooves, as measured around the entire circumference of the tread.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Radial" and "radially" means directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Section height" (SH) means the radial distance from the nominal rim diameter to the outer diameter of the tire at its equatorial plane.

"Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Tire design load" is the base or reference load assigned to a tire at a specific inflation pressure and service condition: other load-pressure relationships applicable to the tire are based upon that base or reference.

"Trailing" refers to a portion or part of the tread that contacts the ground last, with respect to a series of such parts or portions during rotation of the tire in the preferred direction.

"Tread arc width" (TAW) means the width of an arc having its center located on the plan (EP) and which substantially coincides with the axially outermost surfaces of the various traction lugs across the lateral or axial width of the tread portions of a tire when the tire is mounted upon its designated rim and inflated to its specified inflation pressure but not subjected to any load.

"Tread width" (TW) means the length of the tread surface in the axial direction, that is, in a plane passing through the axis of rotation of the tire. The tread width being the axial length between the lateral edges of the tread.

"Unit tread pressure" means the radial load borne per unit area (square centimeter or square inch) of the tread surface when that area is in the footprint of the normally inflated and normally loaded tire.

DESCRIPTION OF THE DRAWINGS

The following is a brief description of the drawings in which like parts bear like reference numerals and in which.

DETAILED DESCRIPTION OF THE INVENTION

Figure 6:
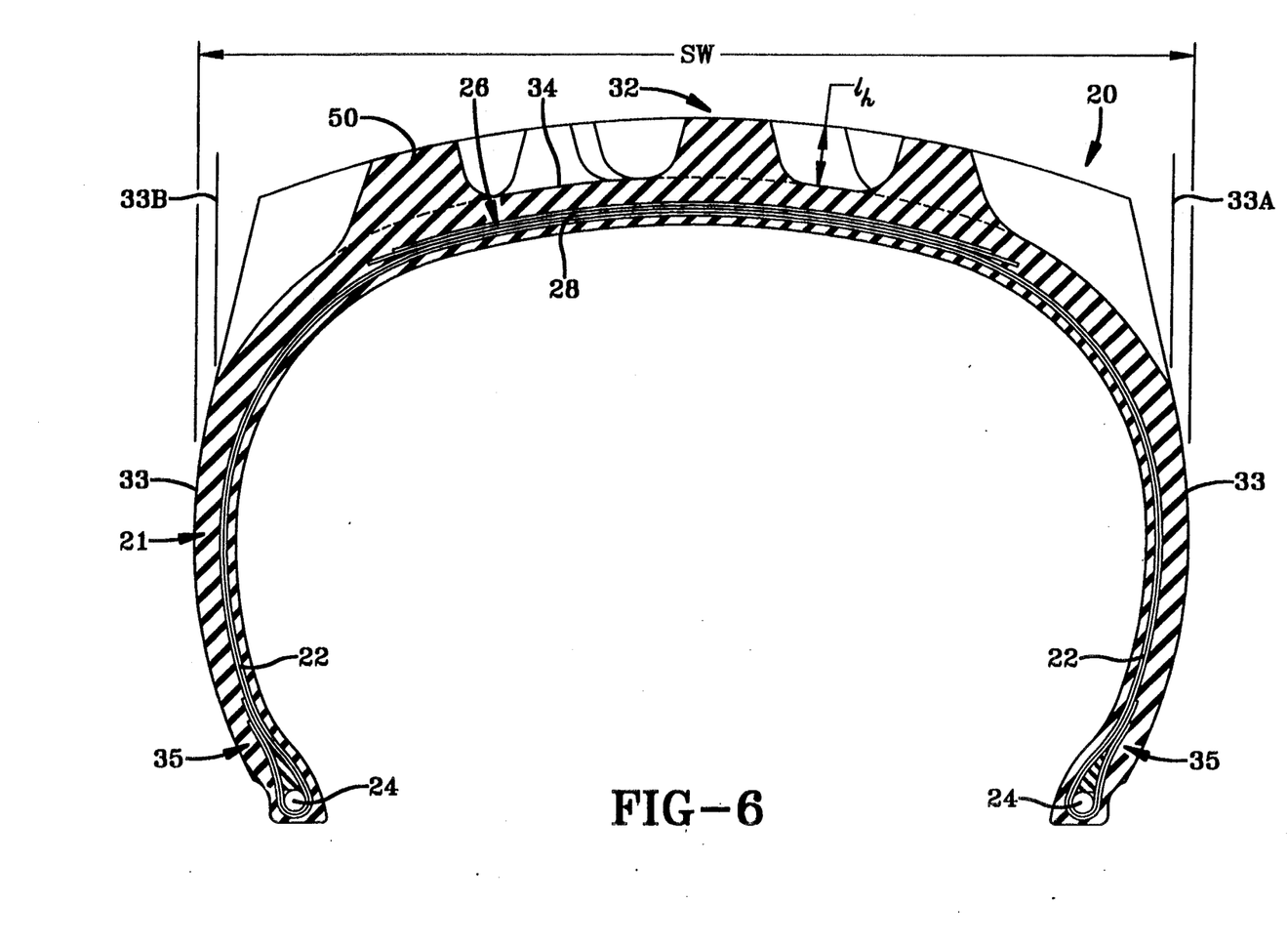
FIG. 6 is a cross-sectional view of the preferred tire taken along lines 5—5 of FIG. 3.

Now referring to FIG. 6, a tire is shown in cross-section view generally as reference numeral 20. The pneumatic tire has a carcass 21 having one or more carcass plies 22 extending circumferentially about the axis of rotation of the tire 20. The carcass plies are anchored around a pair of substantially inextensible annular beads 24. A belt reinforcing member 26 comprising one or more belt plies 28 are disposed radially outwardly from the carcass plies. The belt plies provide reinforcement for the crown region of the tire. A circumferentially extending tread portion 32 is located radially outwardly of the belt reinforcing structure 26.

A sidewall portion 33 extends radially inwardly from each axial or lateral edge 34A,33B of the tread portion to an annular bead portion 35 having the beads 24 located therein.

The carcass plies 22 preferably have textile or synthetic cords reinforcing the plies. The cords are preferably oriented radially. Most preferably, the cords are made of polyester or nylon material. Typically, the tire may have two, three or four plies, each construction increasing in load carry capability as a function of the number of plies.

The belt reinforcement member 26 preferably includes at least two belts reinforced by synthetic cords of rayon or aramid.

The prior art tire 10 of FIG. 1 has a carcass construction similar to that described above. The tread 11 of the prior art tire 10 has two sets of long lugs 41,42, a first set of lugs 41 extending from a tread edge to the equatorial plane of the tire 10 and a second set of lugs 42 extending from the opposite tread edge to the equatorial plane. Each lug 41,42 extends radially outwardly from an inner tread 12. The lugs 41,42 depicted have a radial depth about 125% that of a conventional R-1 type lug and a lug length greater than 50% of the tires section width.

Now referring to FIGS. 2-6, a tire 20 according to the present invention is illustrated. The tire 20 according to the present invention has a unique tread 32. The tread 32 has a first tread edge 33A and a second tread edge 33B. Disposed between the tread edges 33A,33B is an inner tread 34 and a plurality of lugs 50 extending radially outwardly from the inner tread 34.

Figure 5:
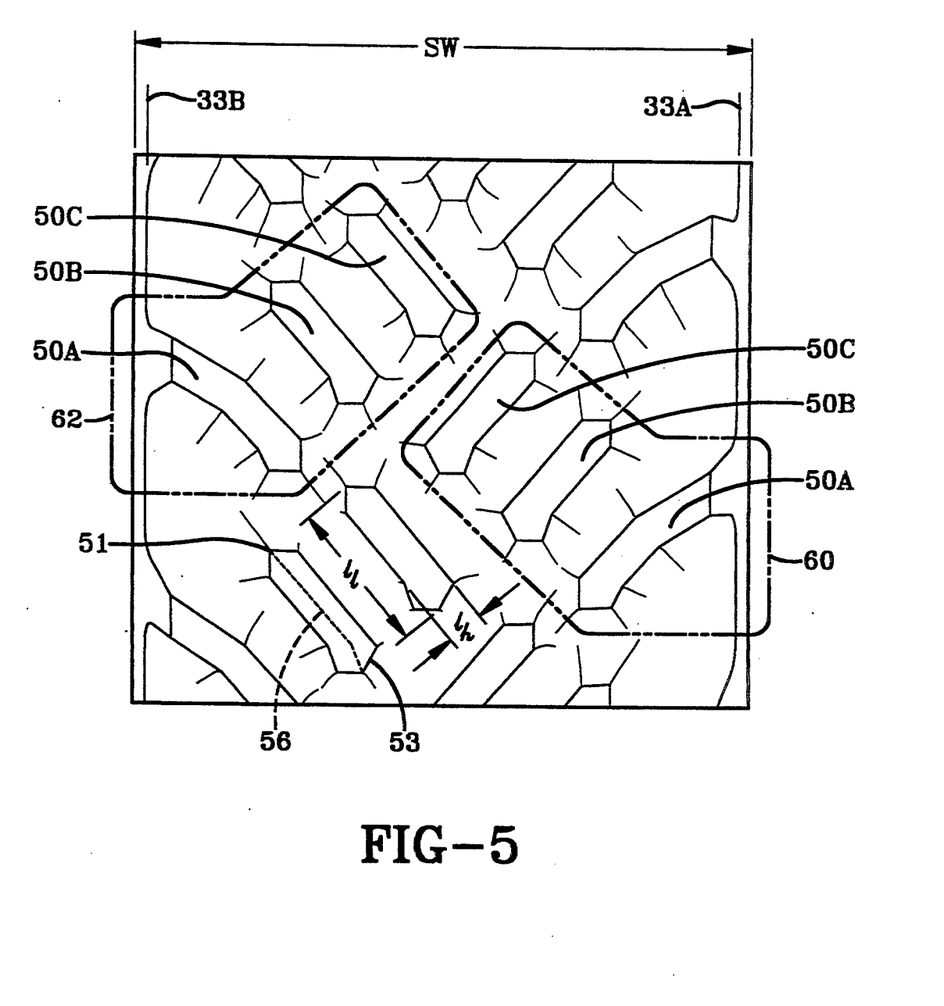
FIG. 5 is a fragmentary view of a tread portion of the preferred tire according to the present invention.

As illustrated in FIG. 5 each lug 50 has a radially outer surface 58, a leading edge 52, trailing edge 54 and a centerline 56 between the leading and trailing edges. Each lug 50 extends generally axially inwardly from an axially outer end 51 to an axially inner end 53.

The distance along the centerline 56 between the axially outer and inner ends 51,53 defines the length (l) of the lug 50.

The distance perpendicular to the centerline 56 and extending between the leading and trailing edges 52,54 of the lug define the lug width ($l_w$). The radial distance extending between the inner tread 34 and the edges 52,54 of the lug 50 defines the radial lug height ($l_h$). The ratio of the lug width ($l_w$) to lug radial height ($l_h$) is less than 0.8 over at least 70% of the lug length ($l_l$).

In the illustrated preferred embodiment of the invention as shown in FIGS. 2-5 the lugs 50 are arranged in two sets 60,62 of at least three axially adjacent lugs 50A,50B,50C. Within each set 60,62 as illustrated the three lugs 50A,50B,50C are oriented substantially parallel to one another, the lug 50A being adjacent or adjacent a tread edge 33A,33B lug 50B being position between lugs 50A and, 50C, lug 50C being adjacent to and partially intersecting the equatorial plane. Lugs 50B and 50C are substantially equal in length while lug 50A is shown has a compound shape greater in length than lugs 50B and 50C. In the illustrated embodiment the axially inner ends 53 of each lug 50A,50B, and 50C within a set 61 or 62 are aligned axially and circumferentially in almost a linear path. The approximately linear path is inclined at an angle α relative to the equatorial plane, the angle α being about 50°. The angular alignment and position of lugs insures that open soil discharge channels are maintained to prevent soil from packing the tread. Ideally each lug's outer surface 58 is spaced at least 5% of the section width (SW) from the outer surface 58 of an adjacent lug 50.

As further illustrated the sets 60,62 of lugs 50 are repeated circumferentially around the tread 32. The set 60 of lugs 50 are oriented about perpendicular to the set 62 of lugs 50. In the preferred embodiment the lugs of set 60 were oriented 81° relative to the lugs of set 62. When viewed in from the partial contact path of the tire as shown in FIG. 7, the lugs of set 60 measured an angle of 83° relative to the lugs of set 62.

The lugs 50 as shown are relatively short in length ($l_l$) as compared to the section width (SW) of the tire 20. The lugs 50 being less than 40% of the section width preferable less than 30% and more preferably less than 20%. The lugs 50 as shown also had a preferred minimum length of at least 10% of the section width. These relatively short lugs greatly improve the flexibility of the tread and are believed to yield greatly reduced soil compaction compared to conventional longer lugs. As illustrated the lugs within a set 60,62 may vary in shape and length. Additionally, the adjacent sets 60 may have lugs varied in length to effect a variable pitch pattern about the tread.

Figure 7:
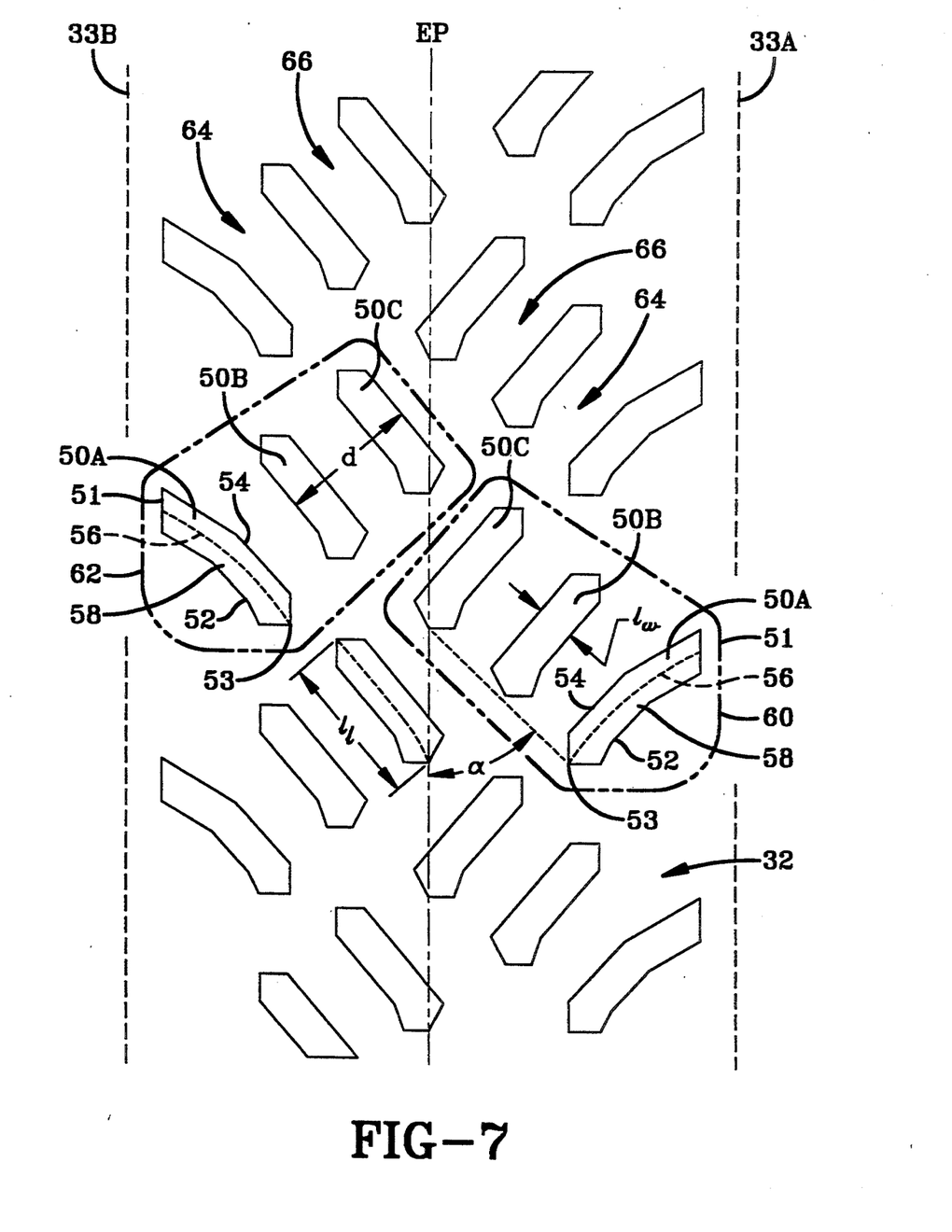
FIG. 7 is a plan view of a portion of the contact path of the preferred tire according to the present invention.

As shown in FIG. 7, the lugs 50B and 50C are oriented such that the radially outermost surfaces 58 are spaced a distance "d" as measured from the trailing edge of lug 50C to the leading edge of lug 50B. The spaced distance "d" is about equal to the length of lugs 50B or 50C. In the preferred embodiment the distance "d" was 95% of the length of lugs 50B or 50C.

As illustrated the trailing edge 54 of lug 50C of set 60 is approximately aligned with the axially outer ends 51 of the three lugs 50A,50B,50C of a set 62. This alignment is believed to create long soil discharge channels 64 between circumferentially adjacent sets of lugs. As further can be observed the channel 64 extends about linearly from tread edge 33A to tread edge 33B, wherein lugs 50C and 50B are adjacent the channel 64 at one tread edge and the channel is bounded by two circumferentially adjacent sets of at least 3 lugs on the opposite side of the tread 32. Unlike the long channels created by tractor tires having long bars or lugs as shown in FIG. 1, the tread of the present invention has long channels 64 intersected by a plurality of cross-channels 66. These areas give the soil a location to be displaced to as the tires turn. This feature greatly facilitates the maneuverability of the tractors through the soil.

The tread's use of many short lugs actually increases the lug's tractive leading edge zones of shear as well as increasing the total radial outer surface area 58 of the lugs 50. This increased surface area of about 1,375 sq. inches in the exemplary size 710/70R38 when compared to the prior art tire's surface area of about 1,260 sq. inches has permitted two important benefits to be achieved. The tire according to the present invention can have a lighter weight than the prior art tire of FIG. 1 and the lugs can be made radially shorter while surpassing the excellent traction of the prior art tire. As shown the lugs have a radial height 25% less than the prior art tire of FIG. 1 or about 100% of a typical R-1 depth. The weight of the tread and sidewall rubber has been reduced for example in a 710/70R38 tire from about 478 lbs. in the prior art tire to about 365 lbs. in the same size tire according to the present invention. The carcass weight increased by about 8 lbs. due to the fact that the outside diameter of the tire was maintained at about 76 inches with the shorter lugs which means that the carcass was extended radially outwardly when compared to the prior art tire. Naturally this reduction of over 100 lbs. per tire enables a significant cost savings to be achieved while providing the customer a tire with superior ride and performance.

It is important to observe that the exact tread lug pattern or orientation employed can be altered or shifted in a variety of ways. It is believed important that the employment of circumferentially repeated sets of at least three axially adjacent substantially parallel lugs in both sides of the tread be accomplished with lugs of relatively short length to achieve the benefits of reduced weight, improved traction and reduced vibration and soil compaction.

The tire according to the present invention employs at least six rows of lugs, at least four rows being center lugs and has a pattern unique from the commercially sold Goodyear DT 710 tread pattern an earlier invention of the named inventors. During the development of the earlier DT 710 product it was determined that the two rows of center lugs employed on the DT 710 pattern could not be directly applied to the large wide base farm tire sizes having 600 mm cross sections and wider.

The inventors observed the DT 710 tread design as commercially sold and the tread pattern of the present invention are unique to one another in that there is no apparent tire size overlapping with their respective preferred pattern layouts. The DT 710 tread pattern, when scaled up for wide base tires, has too large a shoulder void spacing between lugs which would induce vibration and is therefore not applicable for large wide base tire sizes. The tread pattern of the present invention has certain scaling limitations that make it not well suited for the narrower more conventional tractor tires. The present invention has a pattern that "closes up" as the tread arc width becomes smaller and it becomes difficult to maintain sufficient lug spacing.

The inventors developed a tire according to the present invention having a carcass using four belt plies and four radial plies in a size 710/70R38, the materials and construction of the casing being the same as the Super Traction Radial of the same sized the mold shape of the carcass being slightly different to accommodate the different tread pattern. This type and size tire has a normal inflation of 17 psi and normal load of 9,650 lbs.

Test tires were then placed for field evaluation and in-house testing. At one test farm in Michigan, dual 710/70R38 test tires were used to replace a tripled 4-wheel drive set-up. In this subjective comparison, the test tires . . . ,
    had less lug induced vibration during hard surface roading
    provided better flotation
    pulled the same implements using less ballast which translates into a fuel savings
In addition, the dualed test tire set-up reduced the overall width of the tractor by about 1-foot on each side that helped the maneuverability of the tractor during road transport.

Regarding in-house testing of the inventive design, a vibration evaluation (both subjective and instrumented) and a tractive performance has been completed at the Goodyear San Angelo facility. In this testing, the test tire was clearly superior when compared against a 710/70R38 DT 820 control (the inline conventional single lug design of FIG. 1). These results are provided as follows.

EXPERIMENTS

Vibrational Analysis

An experiment was conducted to compare the vibration characteristics of a tire 20 according to FIGS. 2-6 with that of a control tire 10 according to FIG. 1 known as The Goodyear Super Traction Radial. The experiment included both measured data and subjective data.

The measured data was gathered by three accelerometers mounted on a John Deere F-49 JD4240 tractor. One accelerometer was mounted on the axle, one on the cab floor and one on the cab roof. Each accelerometer sensed the acceleration in G forces along a different axis. The data gathered by the cab roof and floor accelerometers is believed to be very important because they relate to what a driver perceives and feels, respectively while driving the tractor. The axial data, although gathered, is believed to be of a lesser importance.

The rear tires of the tractor were locked with respect to each other and the vehicle speed was stepped from 0.5 mph to 19.5 mph in 0.5 mph increments. Significant accelerations including amplitude and frequency, at any of the above vehicle speeds were then measured by the accelerometers for a particular orientation of tread lugs between the rear tires. Depending upon the number of different tread elements there are a number of different tread lug orientations (also referred to as phase angles) between the two rear tires. The tire according to FIGS. 2-6 has six different phase combinations. In like manner the control tire has two different phases or combinations.

At each combination of vehicle speed and tire phase angle, all three vibrations were resolved into a series of superimposed sine curves by means of a Fourier transform. The amplitudes and frequencies of these equivalent sine curves were then tabulated and plotted against the vehicle speed for each accelerometer location for each tire construction at each phase angle.

The data of Table 1 represents the largest accelerations recorded for each tire at each different phase combination. The control tire had a width of 28.09 inches, an OD of 75.98 inches, an SLR of 34.75, 38 lugs and was inflated to 9 psi.

The test tire had a width of 28.00 inches, an OD of 76.45 inches an SLR of 34.90, 120 lugs and was inflated to 9 psi.

TABLE 1

| | CONTROL TIRE | | | TEST TIRE | | |
|---|---|---|---|---|---|---|
| PHASE | LOCATION | "G" LEVEL | FREQ | PHASE | "G" LEVEL | FREQ |
| PHASE I | -AXLE | .14 | | PHASE I | .08 | |
| | -FLOOR | .68 | | | .08 | |
| | -ROOF | .57 | | | 0.00 | |
| | -FREQ | | 15.0 | | | 1.5 |
| PHASE II | -AXLE | .08 | | PHASE II | .28 | |
| | -FLOOR | .14 | | | 0.00 | |
| | -ROOF | 1.43 | | | .45 | |
| | -FREQ | | 9.0 | | | 10.5 |

TABLE 1-continued

| | CONTROL TIRE | | | TEST TIRE | | |
| --- | --- | --- | --- | --- | --- | --- |
| PHASE | LOCATION | "G" LEVEL | FREQ | PHASE | "G" LEVEL | FREQ |
| PHASE III | -AXLE | | | PHASE III | .08 | |
| | -FLOOR | | | | .08 | |
| | -ROOF | | | | .14 | |
| | -FREQ | | | | | 10.5 |
| PHASE IV | -AXLE | | | PHASE IV | .08 | |
| | -FLOOR | | | | .14 | |
| | -ROOF | | | | .08 | |
| | -FREQ | | | | | 16.5 |
| PHASE V | -AXLE | | | PHASE V | .14 | |
| | -FLOOR | | | | 0.00 | |
| | -ROOF | | | | .14 | |
| | -FREQ | | | | | 1.5 |
| PHASE VI | -AXLE | | | PHASE VI | .14 | |
| | -FLOOR | | | | .08 | |
| | -ROOF | | | | .14 | |
| | -FREQ | | | | | 1.5 |

The amplitude of the accelerations, ie. vibrations of the test tire are generally as low or lower than those of the associated control tire. This was further confirmed by subjective testing. The subjective testing was performed by unlocking the differential of the tractor and driving it in a series of S-curves. This had the effect of sweeping through all the phases of the tire lug combinations. A subjective rating on a scale of 1-10, with 10 being the highest, and best rating was then recorded for different speed ranges as shown in Table 2.

TABLE 2

| TIRE | 0-5 MPH | 5-10 MPH | 10-15 MPH | 15-20 MPH |
| --- | --- | --- | --- | --- |
| CONTROL | 6.0 | 6.0 | 6.0 | 6.0 |
| TEST | 6.5 | 7.0 | 7.0 | 7.0 |

Drawbar, Pull Ratio and Tractive Efficiency Tests

The control tires and test tires are mounted on a John Deere 4840 tractor which pulls a second tractor by means of a chain attached to a load cell. The test tractor is accelerated to a ground speed of 3.5 mph; the throttle setting then remains constant for the remainder of the test. Each rear drive tire carries a load of 6,400 lbs. per tire at 9 psi and 10,910 lbs. per tire at 18 psi.

The holdback (rear) tractor gradually decelerates to increase the drag (drawbar force) on the front tractor; this causes the test tires to slip. The slip is increased from 0% to 40% during each test.

All tires are tested in both tilled and untilled soil. Tilled soil has been turned since the last harvest. Untilled soil has been turned in the past, but a crop has been harvested since the last tilling. Untilled soil usually has stubble remaining on it.

Vehicle speed (VS), drive axle RPM (RPM), horizontal (DBH) and vertical (DBV) drawbar force, left and right drive axle torque (ST), and percent slip are recorded. Dynamic rear weight (WRD) is calculated from static rear weight (RWS) and the load/unload effect due to the vertical component of drawbar.

Tires are rated against the control for drawbar, pull ratio, and tractive efficiency. These parameters are defined as:

Drawbar (DB) = Horizontal drawbar force = DBH
Pull Ratio (PR) = Drawbar divided by Dynamic rear weight = DBH / WRD
Tractive Efficiency (TE) = Drawbar times Vehicle Speed times 14 divided by Sum of torque times Axle RPM = (DBH * VS * 14.0) / (ST * RPM)

| Tire Construction | Tilled Soil Rating | | | Untilled Soil Rating | | | Tire Inflation |
| --- | --- | --- | --- | --- | --- | --- | --- |
| | DB | PR | TE | DB | PR | TE | |
| Control (Goodyear Super Traction Radial 710/70R38 | 100 | 100 | 100 | 100 | 100 | 100 | 9 psi |
| Test Tire 710/70R38 | 108 | 106 | 103 | 113 | 110 | 102 | 9 psi |
| Control (Super Traction Radial) 710/70R38 | 100 | 100 | 100 | 100 | 100 | 100 | 18 psi |
| Test Tire 710/70R38 | 106 | 105 | 101 | 116 | 114 | 103 | 18 psi |

The drawbar force (DB) and the Pull Ratio (PR) of the test tire was markedly higher at either of the tire inflation conditions when compared to the control tires. The tractive efficiency was the same or slightly better.

What is claimed:

1. A pneumatic agricultural tire having a maximum section width of 600 mm or greater, an axis of rotation, an equatorial plane perpendicular to the axis and a nominal rim diameter of 24.0 inches (61 cm) or greater, the tire having a casing having a carcass reinforced with rubber coated cord and a rubber tread disposed radially outwardly of the carcass, the tread including an inner tread and plurality of tread lugs, the lugs having a length of at least 10% of the maximum section width, the tread having a first and a second tread edge and a net-to-gross ratio of less than 40%, the tread being characterized by: a first set of at least three axially adjacent substantially parallel lugs, the first set repeated a plurality of times circumferentially about the tread; the first sets being located on a first side of the tread primarily between the first tread edge and the equatorial plane; a second set of at least three axially adjacent substantially parallel lugs, the second set repeated a plurality of times circumferentially about the tread; the second sets being located on a second side of the tread primarily between the second tread edge and the equatorial plane, each lug of the first and second set of lugs having a radial height of about 100% of an R-1 lug depth, the R-1 lug depth being defined as specified by industry standards, in the footprint of the normally loaded and normally inflated tire each set of at least three lugs are substantially perpendicular to the at least three lugs of a set located on the opposite side of the tread.

2. The pneumatic agricultural tire of claim 1 wherein the axially inner two lugs of the sets of at least three lugs have radially outermost surfaces, the surfaces having an outermost spacing approximately equal to the length of an axially innermost lug.

3. The pneumatic agricultural tire of claim 2 wherein each set of at least three lugs on one side of the equatorial plane are inclined similarly and each set of at least three lugs on the opposite side are inclined similarly but opposite in hand.

4. The pneumatic agricultural tire of claim 3 wherein each set has axially outer lugs adjacent a tread edge, the lugs adjacent the tread edge have a length greater than the other axially inner lugs within the set.

5. The pneumatic agricultural tire of claim 1 wherein each lug has a radially outer surface, and wherein each radially outer surface of a lug is spaced a minimum distance of at least 5% of the section width from the radially outer surface of an adjacent lug.

6. The pneumatic agricultural tire of claim 1 wherein the lugs have a length less than 40% of the section width.

7. The pneumatic agricultural tire of claim 6 wherein the lugs have a length less than 30% of the section width.

8. The pneumatic agricultural tire of claim 1 wherein the first set is repeated at least 15 arrays and the second set is repeated at least 15 arrays.

9. The pneumatic agricultural tire of claim 8 wherein the first set is repeated 20 times around the circumference and second set is repeated 20 times around the circumference.

10. The pneumatic agricultural tire of claim 1 wherein at least one lug within each set intersect the equatorial plane.

11. The pneumatic agricultural tire of claim 10 wherein the lugs of opposite set intersecting the equatorial plane are similar but oppositely inclined.

12. The pneumatic agricultural tire of claim 1 wherein the sets each include three lugs, a first lug being adjacent to the tread edge, a second lug interposed between the first and third lugs, the third lug being adjacent to the equatorial plane, the second lugs of the first set being oriented substantially aligned with a space between two adjacent sets of lugs on the opposite side.

13. The pneumatic agricultural tire of claim 1 wherein each of the at least three lugs within each first and second set of lugs has an axially inner end and an axially outer end, the axially inner ends of the at least three lugs within each set being axially and circumferentially aligned in approximately a linear path.

14. The pneumatic tire of claim 13 wherein the axially inner ends of the at least three lugs within each set are aligned in approximately a linear path, the linear path being inclined at an included angle a relative to the equatorial, $\alpha$ being about 50°.

15. The pneumatic tire of claim 13 wherein each set has three lugs, a first lug adjacent to the tread edge, a second lug interposed between the first and third lugs, a third lug intersecting the equatorial plane, the third lug having a trailing edge, the trailing edge of each third lug being approximately aligned with the axially outer ends of three lugs of a set lugs from the opposite side of the tread.

* * * * *